United States Patent
Erickson et al.

(10) Patent No.: US 9,794,738 B2
(45) Date of Patent: Oct. 17, 2017

(54) SYSTEMS AND METHODS FOR ENFORCING WIRELESS REGULATORY COMPLIANCE

(71) Applicant: GOOGLE INC., Mountain View, CA (US)

(72) Inventors: Grant Michael Erickson, Sunnyvale, CA (US); Hirofumi Honjo, Mountain View, CA (US); David Sloo, Menlo Park, CA (US)

(73) Assignee: GOOGLE INC., Mountain View, CA (US)

( * ) Notice: Subject to any disclaimer, the term of this patent is extended or adjusted under 35 U.S.C. 154(b) by 234 days.

(21) Appl. No.: 14/579,929

(22) Filed: Dec. 22, 2014

(65) Prior Publication Data

US 2016/0182294 A1 Jun. 23, 2016

(51) Int. Cl.
*H04L 12/24* (2006.01)
*H04W 4/02* (2009.01)
*H04W 4/00* (2009.01)

(52) U.S. Cl.
CPC .............. *H04W 4/02* (2013.01); *H04W 4/005* (2013.01)

(58) Field of Classification Search
CPC ...... F24F 2011/0068; F24F 2011/0071; H04L 12/2803
See application file for complete search history.

(56) References Cited

U.S. PATENT DOCUMENTS

| | | | |
|---|---|---|---|
| 5,974,171 A * | 10/1999 | Hayashi | G06K 19/06009 382/162 |
| 7,809,844 B2 | 10/2010 | Abhishek et al. | |
| 8,752,771 B2 | 6/2014 | Warren et al. | |
| 2005/0148368 A1 * | 7/2005 | Scheinert | H04W 24/02 455/561 |
| 2010/0106324 A1 | 4/2010 | Grohman | |
| 2012/0199660 A1 | 8/2012 | Warren et al. | |
| 2012/0201155 A1 | 8/2012 | Du et al. | |
| 2012/0256009 A1 * | 10/2012 | Mucignat | G05D 23/1905 236/1 C |
| 2013/0130708 A1 | 5/2013 | Chhaya et al. | |
| 2013/0338839 A1 | 12/2013 | Rogers et al. | |
| 2014/0003606 A1 | 1/2014 | Birnbaum et al. | |
| 2014/0226572 A1 | 8/2014 | Thota et al. | |
| 2014/0323108 A1 | 10/2014 | Doubek et al. | |

(Continued)

FOREIGN PATENT DOCUMENTS

| | | |
|---|---|---|
| KR | 10-2012-0039745 | 4/2012 |
| WO | 2013/174928 | 11/2013 |
| WO | 2014/155037 | 10/2014 |

*Primary Examiner* — David Oveissi
(74) *Attorney, Agent, or Firm* — Van Court & Aldridge LLP

(57) ABSTRACT

This disclosure relates to systems and methods for verifying that a device is using its Wi-Fi circuitry in compliance with the regulations governing the location in which the device is located. Embodiments discussed herein can verify the location using location verification tools that evaluate locally ascertainable factors that contribute to a probability determination of the device's location. Locally ascertainable factors include information that be gleaned from the surroundings of the device. The surroundings or environment in which the device resides may provide clues as to whether the device is located in a particular regulatory domain.

18 Claims, 8 Drawing Sheets

(56) References Cited

U.S. PATENT DOCUMENTS

| | | | |
|---|---|---|---|
| 2015/0103814 A1* | 4/2015 | Wang .................... | H04W 8/183 |
| | | | 370/338 |
| 2015/0138860 A1* | 5/2015 | Cheng .................. | H03K 17/962 |
| | | | 363/140 |

* cited by examiner

SYSTEMS AND METHODS FOR ENFORCING WIRELESS REGULATORY COMPLIANCE

TECHNICAL FIELD

This patent specification relates to systems and methods for selectively enabling wireless communication channels. More particularly, this specification relates to techniques for selectively enabling wireless communication channels for Wi-Fi devices.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Many countries in the world have allocated their own radio spectrum and have regulated the use of that spectrum, leading to a potential patchwork of large and divergent wireless compliance challenges. This patchwork leads to both technical and logistical challenges for companies that design, manufacture and sell world-ready wireless-enabled products with the fewest number of customized, region-specific models or SKUs.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

This disclosure relates to systems and methods for verifying that a device is using its Wi-Fi circuitry in compliance with the regulations governing the location in which the device is located. Embodiments discussed herein can verify the location using location verification tools that evaluate locally ascertainable factors that contribute to a probability determination of the device's location. Locally ascertainable factors include information that be gleaned from the surroundings of the device. The surroundings or environment in which the device resides may provide clues as to whether the device is located in a particular regulatory domain.

In one embodiment, a method for enforcing wireless regulatory compliance for a wirelessly enabled thermostat is provided. The method includes receiving a user designated selection of a location of the thermostat, initially configuring the thermostat to operate according to a first set of wireless communication channels based on the user designated location, verifying the user designated location by analyzing at least one line power characteristic, if the user designated location is verified, enabling the thermostat to operate according to the first set, and if the user designated location is not verified, re-configuring the thermostat to operate according to a second set of wireless communication channels.

In another embodiment, a method for enforcing wireless regulatory compliance for a home network device is provided. The method includes making an initial compliance determination on how to configure wireless communication circuitry to operate according to a location based wireless regulation, verifying whether the initial compliance determination is reasonably accurate by validating the location of the device using at least one location verification tool, continue operating the wireless communications circuitry according to the initial compliance determination in response to a verified initial compliance determination, and re-configuring the wireless communications circuitry to operate according to a different regulatory compliance scheme in response to a non-verified initial compliance determination.

In yet another embodiment, a thermostat is provided that includes wireless communications circuitry for communicating according to an 802.11 protocol, a compliance database including a listing of a plurality of country specific wireless regulations for the 802.11 protocol, a location verification module operative to use at least one location verification tool to assess a location of the thermostat, and a control unit operative to control the thermostat. The thermostat is further operative to select an initial country specific wireless regulation, use the location verification module to determine a location of the thermostat, determine whether the location invalidates the selected initial country specific wireless regulation, configure the wireless communications circuitry to operate according to the selected initial country specific wireless regulation in response to a non-invalidated determination, and re-configuring the wireless communications circuitry to operate according to a different country specific wireless regulation in response to an invalidated determination.

Various refinements of the features noted above may be used in relation to various aspects of the present disclosure. Further features may also be incorporated in these various aspects as well. These refinements and additional features may be used individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

A further understanding of the nature and advantages of the embodiments discussed herein may be realized by reference to the remaining portions of the specification and the drawings.

DETAILED DESCRIPTION OF THE DISCLOSURE

Figure 1:
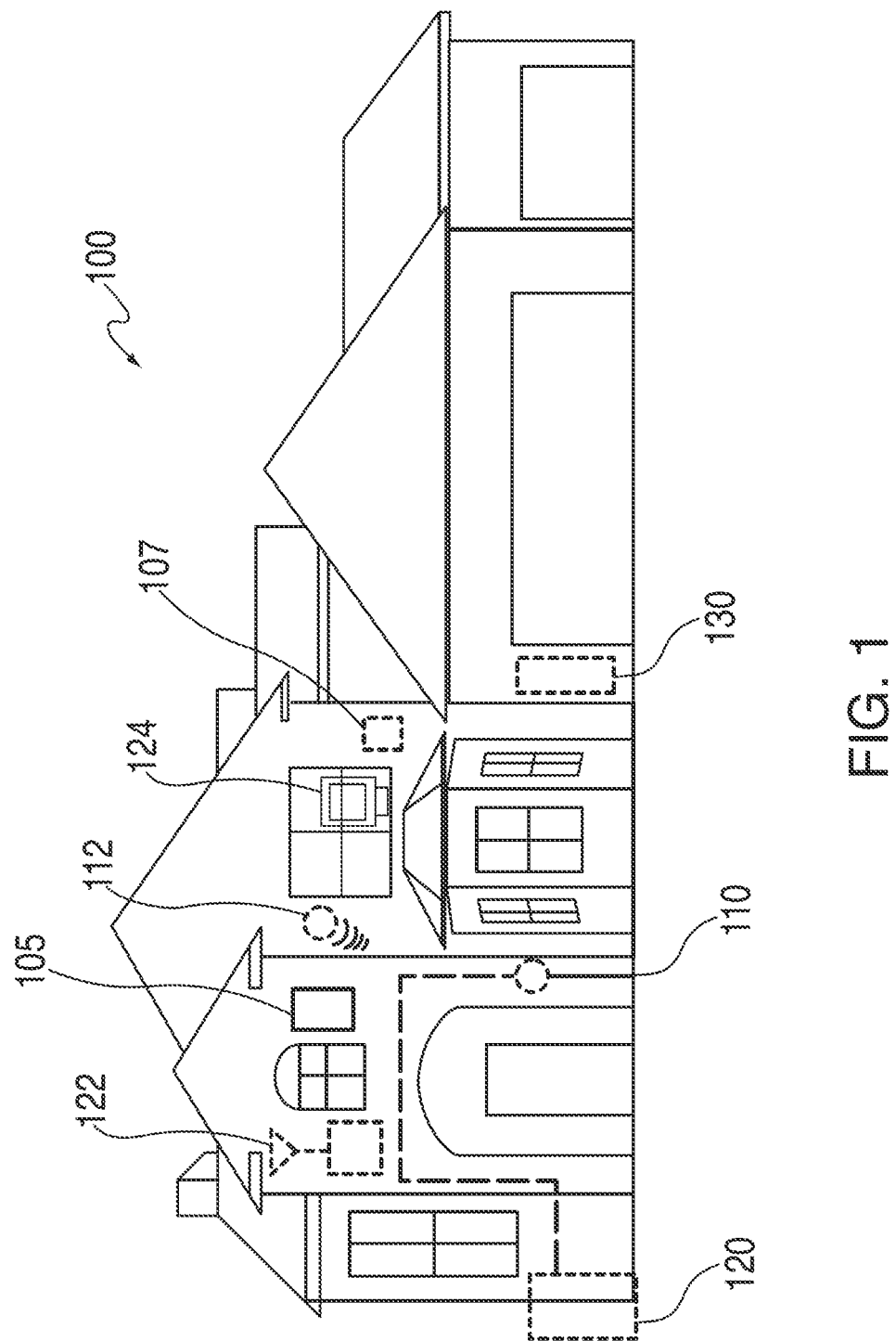
FIG. 1 is a diagram of an enclosure with a hazard detection system, according to some embodiments.

In the following detailed description, for purposes of explanation, numerous specific details are set forth to provide a thorough understanding of the various embodiments. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

Various Wi-Fi enabled devices according to embodiments discussed herein are described in the context of being used in a residential home, such as a single-family residential home, however it should be appreciate that the scope of the present teachings is not so limited. More generally, Wi-Fi enabled devices are applicable to a wide variety of enclosures such as, for example, duplexes, townhomes, multi-unit apartment buildings, hotels, retail stores, office buildings, and industrial buildings. Further, it is understood that while the terms user, customer, installer, homeowner, occupant, guest, tenant, landlord, repair person, and the like may be used to refer to the person or persons who are interacting with the Wi-Fi enabled device in the context of one or more scenarios described herein, these references are by no means to be considered as limiting the scope of the present teachings with respect to the person or persons who are performing such actions.

The support and enforcement of a wireless regulatory infrastructure in software may include two opposing forces. On one side, the wireless regulations strive to make products as customized and as narrowly-scoped as possible for the marketplace into which they are sold and to prevent the end customer from changing that customization in a way that would make the device non-compliant. One the other side, manufacturers endeavor to have the minimum number of custom SKUs to build, track and support as well as the ability to quickly and easily allocate inventory to the appropriate sales channels. Moreover, manufactures desire to minimize cost and complexity by eliminating unnecessary hardware. Embodiments discussed herein accommodate both regulatory and manufacturer concerns by selectively enabling and disabling wireless communication channels, particularly with respect to Wi-Fi communications, based on a location.

Wi-Fi typically operates at frequencies in the 2.4, 3.7, 5 and 60 GHz bands with channel widths of 20, 40, 80 and 160 MHz, worldwide with various restrictions on the allowed channels and transmit power levels within those bands across various countries, regions and regulatory agencies. Wi-Fi is typically associated with the 802.11 protocol. The legacy approach to wireless compliance for Wi-Fi is to provision or customize the device at the time of manufacture for precisely the regulatory requirements for the country into which the product is to be sold. For fixed products such as Wi-Fi access points or desktop computers, this poses few challenges. However, with the explosion of Wi-Fi enabled mobile devices such a phones, media players and laptops, this simplistic approach breaks down as these devices must remain in compliance as they move from region to region and country to country.

Consequently, world-ready Wi-Fi-based products are typically designed and built up front with an eye towards complying with these myriad of regional regulatory requirements without explicit provisioning or customization at the time of manufacture. The Wi-Fi community has addressed this challenge in terms of implementation and standard. In terms of implementation, modern Wi-Fi devices are typically provisioned and manufactured with the worldwide regulatory domain. This encompasses the intersection of all worldwide regulatory requirements and is the most restrictive possible. This ensures that, by default, no matter where such a Wi-Fi device operates, it is guaranteed to be in compliance by default.

In terms of both implementation and standard, Wi-Fi devices can relax this restrictive worldwide regulatory domain to enable additional channels and/or greater transmit power. Implementation-wise, this relaxation is achieved through both external and intrinsic detection. External detection is achieved through complimentary wireless technologies such as 3GSM cellular. Here, a mobile country code (MCC) obtained from the cellular network is used to hint the regulatory domain and, by extension, relax the Wi-Fi regulatory restrictions. Intrinsic detection is achieved through Wi-Fi passive scanning. When Wi-Fi passive scans are conducted, all Wi-Fi channels are monitored, including those not allowed in the worldwide regulatory domain. However, if valid 802.11 traffic is detected and decoded on those non-worldwide channels, the Wi-Fi station assumes it is now operating in a regulatory domain in which those channels are allowed and enables them for use. This is problematic when non-regulatory Wi-Fi traffic is being used to trick the Wi-Fi device into thinking it can use the restricted channel(s).

Standards-based detection is achieved through Wi-Fi 802.11d. 802.11d compliant access points broadcast a two-character ISO-3166-1 regulatory domain country code in the Wi-Fi beacon in addition to other channel and power information. The Wi-Fi station may then use this beacon-gathered information to relax the regulatory restrictions, either implicitly based on the country code or explicitly based on the channel and power information.

Using the implementation and standards based detection, manufacturers can deploy Wi-Fi enabled products that operate in accordance with a worldwide regulatory domain. Although many Wi-Fi enabled products have the ability to operate its Wi-Fi circuitry in accordance with regulatory guidelines that they believe to be the correct guidelines, such devices do not have possess the ability to independently verify their location to ensure they are operating in compliance. There is an implicit trust that ordinary users, for example, cannot easily tamper with the network. As a consequence, there is little motivating need for that independent verification. When such devices typically rely on user inputs or self-determination using one or more wireless communications (e.g., monitoring Wi-Fi traffic, relying on GSM communications, or using other Wi-Fi communications) they can be susceptible to non-compliant Wi-Fi usage.

This disclosure relates to systems and methods for verifying that a device is using its Wi-Fi circuitry in compliance with the regulations governing the location in which the device is located. Embodiments discussed herein can verify the location using location verification tools that evaluate locally ascertainable factors that contribute to a probability determination of the device's location. Locally ascertainable factors include information that can be gleaned from the surroundings of the device. The surroundings or environment in which the device resides may provide clues as to whether the device is located in a particular regulatory domain. Examples of such factors include characteristics (e.g., voltage and frequency) of line power being used to power the device, audio information, video information, air quality information, weather information, lighting information, and other suitable information that may provide clues as to the device's location. The locally ascertainable factors are not meant to be definitive earmarks of the device's location, but indicia that assist the location verification tool in corroborating the accuracy of the regulatory domain initially selected for the device.

Other location information may be obtained by using tools that are designed to provide definitive location information. Such tools may include global position systems (GPS), cellular networks, and Internet Protocol geolocation systems. These tools may provide relatively accurate location information, but require additional hardware and software combinations that may not be practical for use in devices contemplated for use in embodiments discussed herein.

FIG. 1 is a diagram illustrating an exemplary enclosure 100 using hazard detection system 105, remote hazard detection system 107, thermostat 110, remote thermostat 112, heating, cooling, and ventilation (HVAC) system 120, router 122, computer 124, and central panel 130 in accordance with some embodiments. Enclosure 100 can be, for example, a single-family dwelling, a duplex, an apartment within an apartment building, a warehouse, or a commercial structure such as an office or retail store. Hazard detection system 105 can be battery powered, line powered, or line powered with a battery backup. Hazard detection system 105 can include one or more processors, multiple sensors, non-volatile storage, and other circuitry to provide desired safety monitoring and user interface features. Some user interface features may only be available in line-powered embodiments due to physical limitations and power constraints. In addition, some features common to both line- and battery-powered embodiments may be implemented differently. Hazard detection system 105 can include the following components: low power wireless personal area network (6LoWPAN) circuitry, a system processor, a safety processor, non-volatile memory (e.g., Flash), WiFi circuitry, an ambient light sensor (ALS), a smoke sensor, a carbon monoxide (CO) sensor, a temperature sensor, a humidity sensor, a noise sensor, one or more ultrasonic sensors, a passive infra-red (PIR) sensor, a speaker, one or more light emitting diodes (LED's), and an alarm buzzer.

Hazard detection system 105 can monitor environmental conditions associated with enclosure 100 and alarm occupants when an environmental condition exceeds a predetermined threshold. The monitored conditions can include, for example, smoke, heat, humidity, carbon monoxide, radon, methane and other gasses. In addition to monitoring the safety of the environment, hazard detection system 105 can provide several user interface features not found in conventional alarm systems. These user interface features can include, for example, vocal alarms, voice setup instructions, cloud communications (e.g. push monitored data to the cloud, or push notifications to a mobile telephone, or receive software updates from the cloud), device-to-device communications (e.g., communicate with other hazard detection systems in the enclosure), visual safety indicators (e.g., display of a green light indicates it is safe and display of a red light indicates danger), tactile and non-tactile input command processing, and software updates.

Hazard detection system 105 can monitor other conditions that not necessarily tied to hazards, per se, but can be configured to perform a security role. In the security role, system 105 may monitor occupancy (using a motion detector), ambient light, sound, remote conditions provided by remote sensors (door sensors, window sensors, and/or motion sensors). In some embodiments, system 105 can perform both hazard safety and security roles, and in other embodiments, system 105 may perform one of a hazard safety role and a security role.

Hazard detection system 105 can implement multi-criteria state machines according to various embodiments described herein to provide advanced hazard detection and advanced user interface features such as pre-alarms. In addition, the multi-criteria state machines can manage alarming states and pre-alarming states and can include one or more sensor state machines that can control the alarming states and one or more system state machines that control the pre-alarming states. Each state machine can transition among any one of its states based on sensor data values, hush events, and transition conditions. The transition conditions can define how a state machine transitions from one state to another, and ultimately, how hazard detection system 105 operates. Hazard detection system 105 can use a dual processor arrangement to execute the multi-criteria state machines according to various embodiments. The dual processor arrangement may enable hazard detection system 105 to manage the alarming and pre-alarming states in a manner that uses minimal power while simultaneously providing failsafe hazard detection and alarming functionalities. Additional details of the various embodiments of hazard detection system 105 are discussed below.

Enclosure 100 can include any number of hazard detection systems. For example, as shown, hazard detection system 107 is another hazard detection system, which may be similar to system 105. In one embodiment, both systems 105 and 107 can be battery powered systems. In another embodiment, system 105 may be line powered, and system 107 may be battery powered. Moreover, a hazard detection system can be installed outside of enclosure 100.

Thermostat 110 can be one of several thermostats that may control HVAC system 120. Thermostat 110 can be referred to as the "primary" thermostat because it may be electrically connected to actuate all or part of an HVAC system, by virtue of an electrical connection to HVAC control wires (e.g. W, G, Y, etc.) leading to HVAC system 120. Thermostat 110 can include one or more sensors to gather data from the environment associated with enclosure 100. For example, a sensor may be used to detect occupancy, temperature, light and other environmental conditions within enclosure 100. In addition, thermostat 110 can include communications circuitry that enables communications according to any of the 801.11 and 802.15.4 communication standards. Remote thermostat 112 can be referred to as an "auxiliary" thermostat because it may not be electrically connected to actuate HVAC system 120, but it too may include one or more sensors to gather data from the environment associated with enclosure 100 and can transmit data to thermostat 110 via a wired or wireless link. For example, thermostat 112 can wirelessly communicate with and cooperates with thermostat 110 for improved control of HVAC system 120. Thermostat 112 can provide additional temperature data indicative of its location within enclosure 100, provide additional occupancy information, or provide another user interface for the user (e.g., to adjust a temperature setpoint).

Hazard detection systems 105 and 107 can communicate with thermostat 110 or thermostat 112 via a wired or wireless link. For example, hazard detection system 105 can wirelessly transmit its monitored data (e.g., temperature and occupancy detection data) to thermostat 110 so that it is provided with additional data to make better informed decisions in controlling HVAC system 120. Moreover, in some embodiments, data may be transmitted from one or more of thermostats 110 and 112 to one or more of hazard detections systems 105 and 107 via a wired or wireless link (e.g., the fabric network).

Central panel 130 can be part of a security system or other master control system of enclosure 100. For example, central panel 130 may be a security system that may monitor windows and doors for break-ins, and monitor data provided by motion sensors. In some embodiments, central panel 130 can also communicate with one or more of thermostats 110 and 112 and hazard detection systems 105 and 107. Central panel 130 may perform these communications via wired link, wireless link (e.g., the fabric network), or a combination thereof. For example, if smoke is detected by hazard detection system 105, central panel 130 can be alerted to the presence of smoke and make the appropriate notification, such as displaying an indicator that a particular zone within enclosure 100 is experiencing a hazard condition.

Enclosure 100 may further include a private network accessible both wirelessly and through wired connections and may also be referred to as a Local Area Network or LAN. Network devices on the private network can include hazard detection systems 105 and 107, thermostats 110 and 112, computer 124, and central panel 130. In one embodiment, the private network is implemented using router 122, which can provide routing, wireless access point functionality, firewall and multiple wired connection ports for connecting to various wired network devices, such as computer 124. Wireless communications between router 122 and networked devices can be performed using an 802.11 protocol. Router 122 can further provide network devices access to a public network, such as the Internet or the Cloud, through a cable-modem, DSL modem and an Internet service provider or provider of other public network services. Public networks like the Internet are sometimes referred to as a Wide-Area Network or WAN.

Access to the Internet, for example, may enable networked devices such as system 105 or thermostat 110 to communicate with a device or server remote to enclosure 100. The remote server or remote device can host an account management program that manages various networked devices contained within enclosure 100. For example, in the context of hazard detection systems according to embodiments discussed herein, system 105 can periodically upload data to the remote server via router 122. In addition, if a hazard event is detected, the remote server or remote device can be notified of the event after system 105 communicates the notice via router 122. Similarly, system 105 can receive data (e.g., commands or software updates) from the account management program via router 122.

Figure 2:
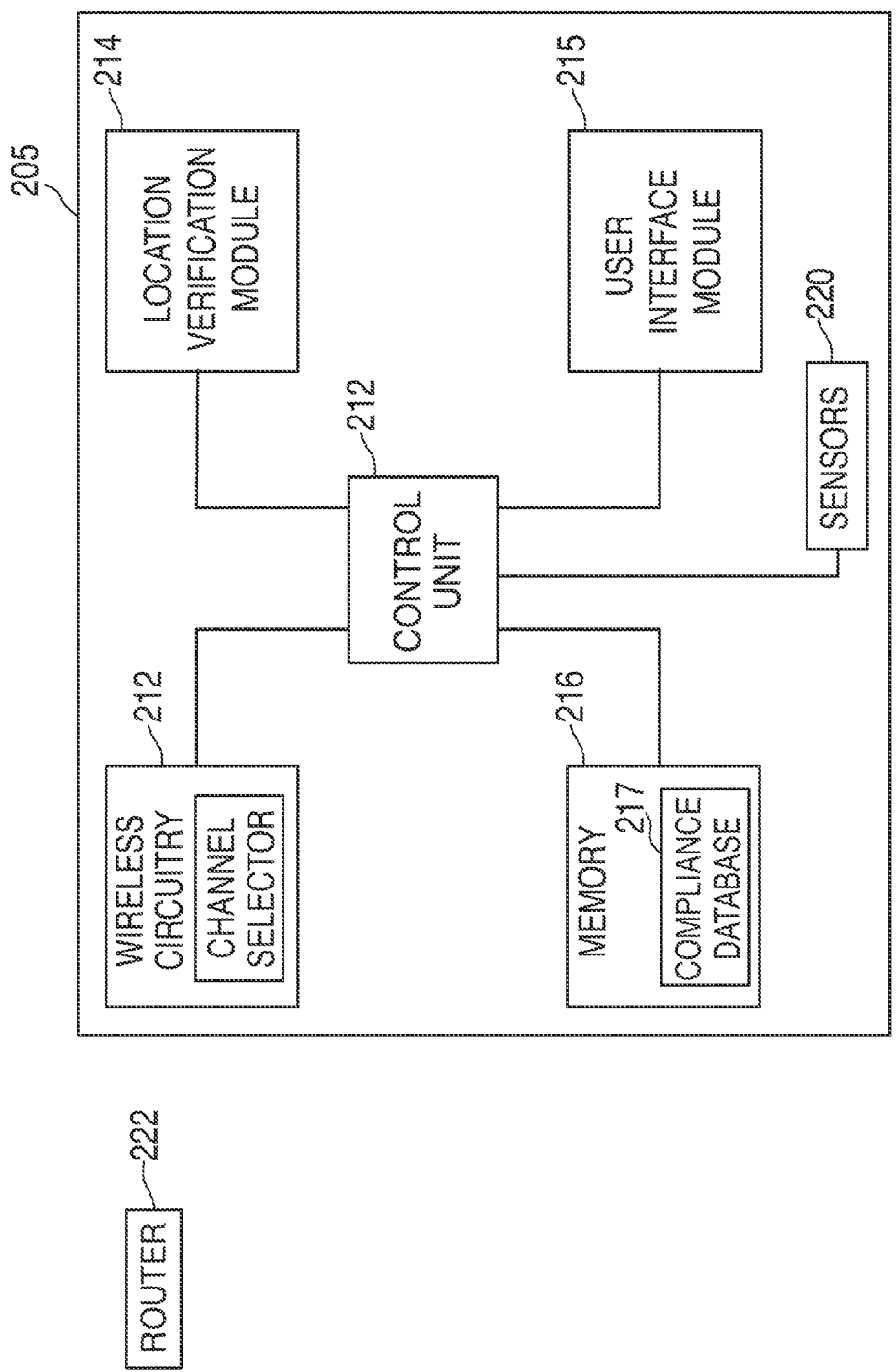
FIG. 2 shows an illustrative block diagram of a hazard detection system being used in an illustrative enclosure, according to some embodiments.

FIG. 2 shows an illustrative block diagram of Wi-Fi enabled device 205 being used in an illustrative enclosure 200 in accordance with some embodiments. FIG. 2 also shows optional router 222. Wi-Fi enabled device 205 can be similar to any one of hazard detection systems 105 and 107 or thermostats 110 of FIG. 1, enclosure 200 can be similar to enclosure 100 in FIG. 1, and router 222 can be similar to router 122 in FIG. 1. Device 205 can include several components, including control unit 210, wireless communications circuitry 212 and antenna, location verification module 214, user interface module 215, memory 216 (e.g., volatile and/or non-volatile memory), sensors 220, and power source 240.

Control unit 210 can include one or more processors that control the operation of device 205. For example, control unit 210 can direct wireless data traffic for wireless communications circuit 212, access memory 216, and execute instructions in modules 215 and 216. As another example, control unit 210 can monitor data acquired by one or more sensors 220 and perform any appropriate actions in response thereto Wireless communications circuitry 212 can be, for example, a Wi-Fi module capable of communicating according to any of the 802.11 protocols. As another example, circuitry 212 can be a relatively low power Wireless Personal Area Network (6LoWPAN) module or a ZigBee module capable of communicating according to a 802.15.4 protocol. Circuitry 212 may include channel selection circuitry 213 that selects which channels may be used to conduct wireless communications. Channel selection circuitry 213 may enforce regulatory compliance by only enabling those channels that are permitted for use in the device's location.

Memory 216 can include volatile memory (e.g., RAM, SDRAM, DRAM) and/or any suitable permanent memory storage such as, for example, NAND Flash, a hard disk drive, NOR, ROM, or phase change memory. In one embodiment, memory 216 can store wireless regulatory database 217. Wireless regulatory database 217 can include wireless compliance information for all of the countries in the world that have promulgated wireless regulation. For example, database 217 can include the Linux wireless regulatory database. Records in the Linux wireless regulatory database may be organized as follows:

country <Country>: <Rule> where <Rule> is:

(<Band Start>-<Band End>@<Band Width>), (<Antenna Gainmax>, <EIRPmax>), <Flags> and where:

<Country> is a two byte alphanumeric identifier used to denote the regulatory domain associated;

<Band Start> is an unsigned integer representing the start of the channel/frequency band, in MHz;

<Band End> is an unsigned integer representing the end of the channel/frequency band, in MHz;

<Band Width> is an unsigned integer representing the maximum channel bandwidth, in MHz, for this rule;

<Antenna Gainmax> is an unsigned integer representing the maximum allowed antenna gain, in dBix100;

<EIRPmax> is an unsigned integer representing the maximum equivalent isotropically radiated power, in dBmx100; and <Flags> are one or more enumerated strings representing additional capabilities added or subtracted to the channel/frequency band. Table 1 below shows illustrative Flags.

TABLE 1

| Flag | Description |
| --- | --- |
| NO-OFDM | OFDM modulation not allowed. |
| NO-CCK | CCK modulation not allowed. |
| NO-INDOOR | Indoor operation not allowed. |
| NO-OUTDOOR | Outdoor operation not allowed. |
| DFS | Dynamic Frequency Selection (DFS) is required. |
| PTP-ONLY | May only be used for point-to-point links. |
| PTMP-ONLY | May only be used for point-to-multipoint links. |
| PASSIVE-SCAN | Passive scanning is required (no active (probe) scans are allowed). |
| NO-IBSS | Independent Basic Service Set (IBSS) (ad-hoc) networks are not allowed. |

Drivers may then use database 217 to perform lookups using a tuple of regulatory domain (i.e. country), channel center frequency and channel bandwidth to first determine whether or not that channel and bandwidth are allowed under the specified regulatory domain and, second, what the power restrictions are.

Sensors 220 can be monitored and controlled by control unit 210. A variety of sensors may be embodied by sensors 220, including, but not limited to a smoke sensor, a heat sensor, a relative humidity sensor, an ambient light sensor, a motion sensor, an ultrasonic sensor, an air quality monitoring sensor, a push button sensor, a user interface sensor, a microphone, a video camera, a HD radio tuner, an FM radio tuner, a TV tuner, an HDTV tuner, an atomic clock, a magnetometer, a line power voltage detector, a line power frequency detector, a weather detector, and a luminescence detector.

Data acquired from one or more sensors 220 can be used by location verification module 214 to corroborate location of the device. In addition, the data acquired by the sensors can be used by control unit 210 to control operation of device 205.

Figure 3A:
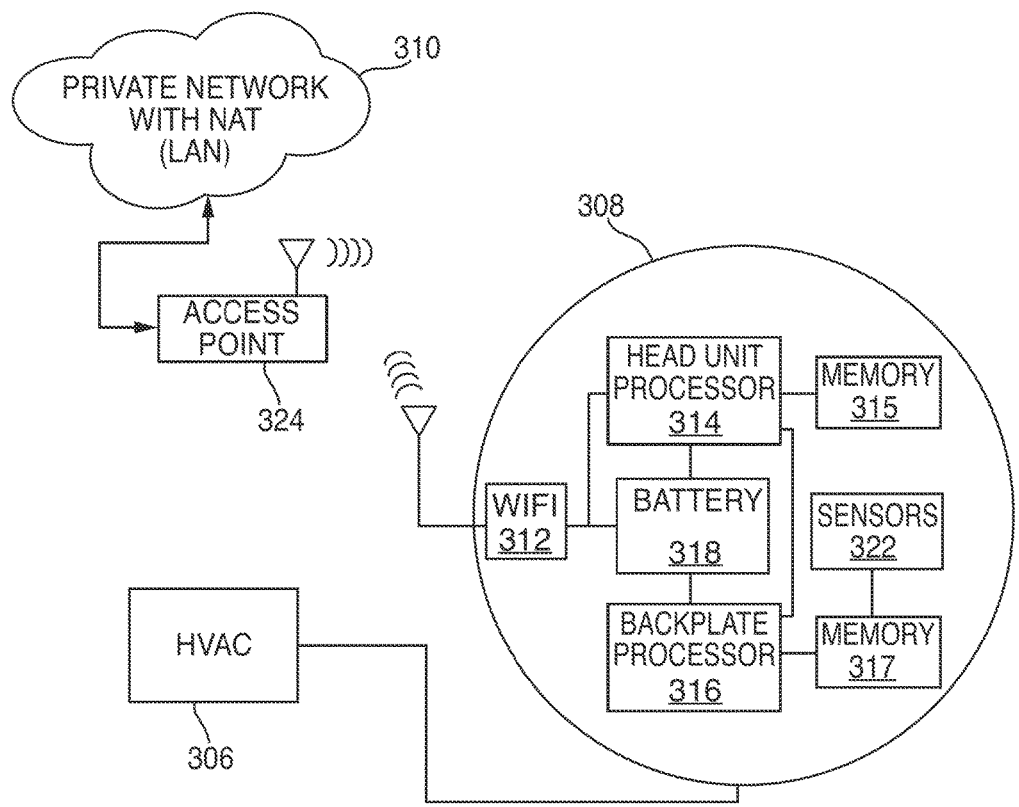
FIGS. 3A and 3B shows illustrative block diagrams a thermostat, according to some embodiments.

Power source 240 can supply power to enable operation of device 205 and can include any suitable source of energy. Embodiments discussed herein can include AC line powered, battery powered, a combination of AC line powered with a battery backup, and externally supplied DC power (e.g., USB supplied power). Embodiments that use AC line power, AC line power with battery backup, or externally supplied DC power may be subject to different power conservation constraints than battery only embodiments. In embodiments where device 205 is a thermostat, power may be derived from HVAC wires are coupled to a backplate Referring to FIG. 3A, a schematic block diagram provides an overview of some components inside a thermostat in accordance with embodiments of the present invention. Thermostat 308 is similar to thermostat 112 in FIG. 1 except that thermostat 308 also illustrates and highlights selected internal components including a Wi-Fi module 312 and antenna, a head unit processor 314 with associated memory 315, a backplate processor 316 with associated memory, and sensors 322 (e.g., temperature, humidity, motion, ambient light, proximity, and others described herein). In one embodiment, head unit processor 314 can be a Texas Instruments AM3703 Sitara ARM microprocessor while backplate processor 316, which may be more specifically referenced to as a "microcontroller", can be a Texas Instruments MSP430F microcontroller.

For some embodiments, the backplate processor 316 is a very low-power device that, while having some computational capabilities, is substantially less powerful than the head unit processor 314. The backplate processor 316 is coupled to, and responsible for polling on a regular basis, most or all of the sensors 322 including the temperature and humidity sensors, motion sensors, ambient light sensors, and proximity sensors. For sensors 322 that may not be located on the backplate hardware itself but rather are located in the head unit, ribbon cables or other electrical connections between the head unit and backplate are provided for this purpose. Notably, there may be other sensors (not shown) for which the head unit processor 314 is responsible, with one example being a ring rotation sensor that senses the user rotation of an outer ring of the thermostat. Each of the head unit processor 314 and backplate processor 316 is capable of entering into a "sleep" state, and then "waking up" to perform various tasks.

The backplate processor 316, which in some embodiments will have a low-power sleep state that corresponds simply to a lower clock speed, generally enters into and out of its sleep mode substantially more often than does the more powerful head unit processor 314. The backplate processor 316 is capable of waking up the head unit processor 314 from its sleep state. For one preferred embodiment directed to optimal battery conservation, the head unit processor 314 is allowed to sleep when its operations are not being called for, while the backplate processor 316 performs polling of the sensors 322 on an ongoing basis, maintaining the sensor results in memory 317. The backplate processor 316 will wake up the head unit processor 314 in the event that (i) the sensor data indicates that an HVAC operation may be called for, such as if the current temperature goes below a currently active heating setpoint, or (ii) the memory 317 gets full and the sensor data needs to be transferred up to the head unit processor 314 for storage in the memory 315. The sensor data can then be pushed up to the cloud server (thermostat management server) during a subsequent active communication session between the cloud server and the head unit processor 314.

In the case of Wi-Fi module 312, one embodiment may be implemented using Murata Wireless Solutions LBWA19XSLZ module, which is based on the Texas Instruments WL1270 chipset supporting the 802.11b/g/n WLAN standard. Embodiments of the present invention configure and program Wi-Fi module 312 to allow thermostat 308 to enter into a low power or "sleep" mode to conserve energy until one or several events occurs. For example, in some embodiments the Wi-Fi module 312 may leave this low power mode when a user physically operates thermostat 308, which in turn may also cause activation of both head-unit processor 314 and backplate processor 316 for controlling functions in head-unit and backplate portions of thermostat 110.

It is also possible for Wi-Fi module 312 to wake from a low power mode at regular intervals in response to a beacon from wireless access point 372. To conserve energy, Wi-Fi module 312 may briefly leave the low power mode to acknowledge the beacon as dictated by the appropriate wireless standard and then return to a low power mode without activating the processors or other components of thermostat 308 in FIG. 3A. In an alternative embodiment, Wi-Fi module 312 may also respond to the beacon by awaking briefly and then activating backplate processor 316, head unit processor 314, or other portions of thermostat 308 to gather data through sensors 322 and store the results in a data log 326 with a time stamp, event type and corresponding data listed for future reference. In accordance with one embodiment, backplate processor 316 may collect data in data log 326 and store in memory 320 for a period of time or until the log reaches a maximum predetermined size. At that point, the backplate processor 316 may wake head unit processor 314 to coordinate an upload of the data log 326 stored in memory 320 over a public network, such as the Internet, to cloud-based management server 516. Uploading data log 326 less frequently saves time and energy associated with more frequent transmission of individual records or log entries.

In yet another embodiment, Wi-Fi module 312 may selectively filter an incoming data packet to determine if the header is merely an acknowledgement packet (i.e., a keep-alive packet) or contains a payload that needs further processing. If the packet contains only a header and no payload, the Wi-Fi module 312 may be configured to either ignore the packet or send a return acknowledgement to the thermostat management system or other source of the packet received.

In further embodiments, Wi-Fi module 312 may be used to establish multiple communication channels between thermostat 112 and a cloud-based management server as will be described and illustrated later in this disclosure. As previously described, thermostat 112 uses multiple communication channels to receive different types of data classified with different levels of priority. In one embodiment, Wi-Fi module 312 may be programmed to use one or more filters and a wake-on-LAN feature to then selectively ignore or discard data arriving over one or more of these communication channels. For example, low-priority data arriving over a port on Wi-Fi module 312 may be discarded by disabling the corresponding wake-on-LAN feature associated with the port. This allows the communication channel to continue to operate yet conserves battery power by discarding or ignoring the low-priority packets.

Operation of the microprocessors 314, 316, Wi-Fi module 312, and other electronics may be powered by a rechargeable battery (not shown) located within the thermostat 110. In some embodiments, the battery is recharged directly using 24 VAC power off a "C" wire drawn from the HVAC system or an AC-DC transformer coupled directly into the thermostat 110. Alternatively, one or more different types of energy harvesting may also be used to recharge the internal battery if these direct methods are not available as described, for example, in U.S. Ser. No. 13/034,678, supra, and U.S. Ser. No. 13/267,871, supra. Embodiments of the present invention communicate and operate the thermostat 110 in a manner that promotes efficient use of the battery while also keeping the thermostat operating at a high level of performance and responsiveness controlling the HVAC system. Some embodiments may use the battery-level charge and the priority or relative importance of a communication to determine when a thermostat management system located on a public network such as the Internet may communicate with the thermostat 110. Further details on the communication methods and system used in accordance with these embodiments are described in detail later herein.

Figure 3B:
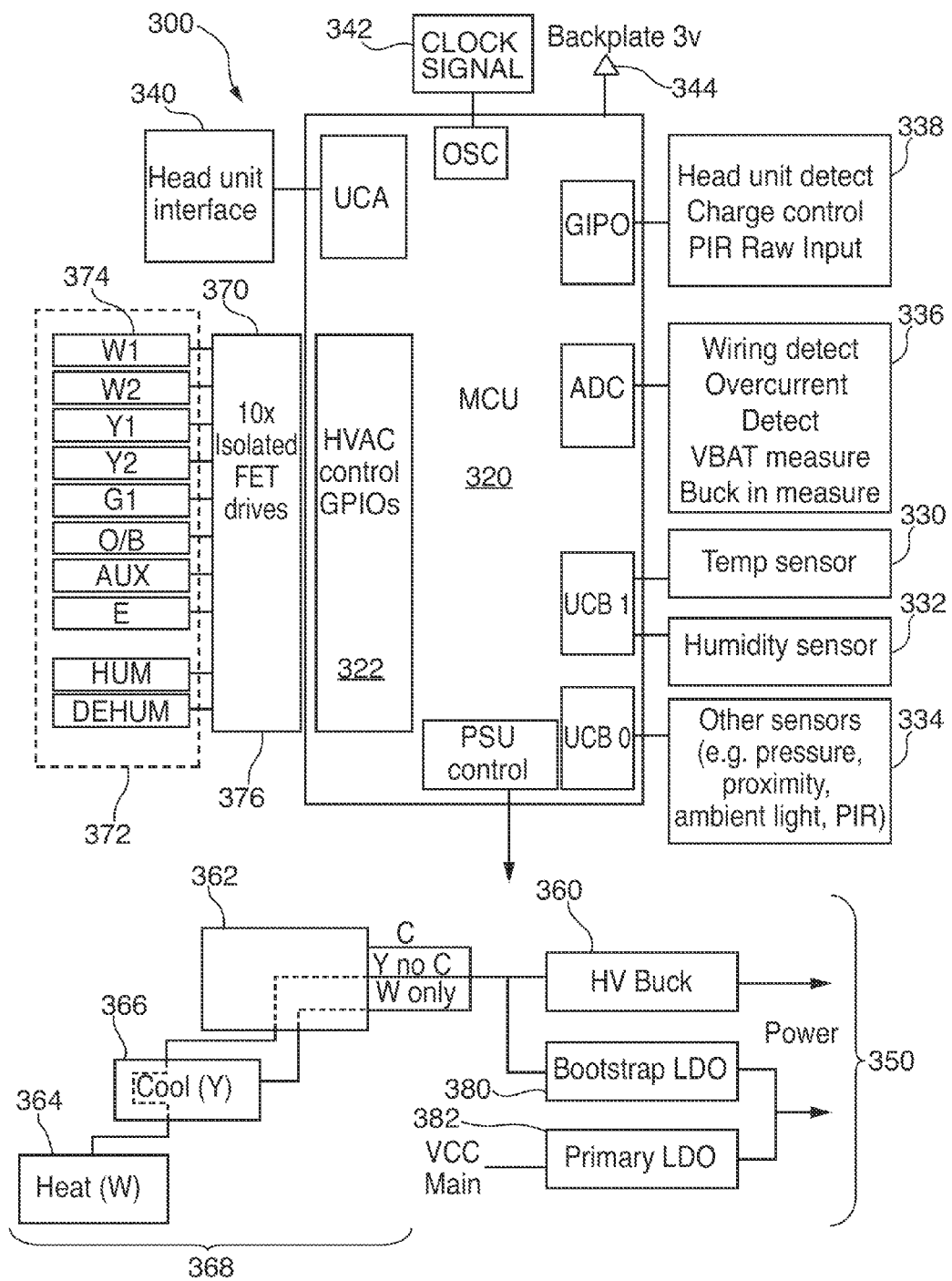

Turning now to power harvesting methods and systems, FIG. 3B is a block diagram of some circuitry of a thermostat, according to some embodiments. Circuitry 300, according to some embodiments, is a backplate of a thermostat. A number of HVAC wires can be attached using HVAC terminals 372. One example of which is the W1 terminal 374. Each terminal is used to control an HVAC function. According to some embodiments, each of the wires from the terminals W1, W2, Y1, Y2, G, O/B, AUX and E is connected to separate isolated FET drives 370. The common HVAC functions for each of the terminals are: W1 and W2 heating; Y1 and Y2 for cooling; G for fan; O/B for heatpumps; and E for emergency heat. Note that although the circuitry 300 is able control 8 functions using the isolated FET drives 370, according to some embodiments, other functions, or fewer functions can be controlled. For example circuitry for a more simply equipped HVAC system may only have a single heating (W), and single cooling (Y) and a fan (G), in which case there would only be three isolated FET drives 370. According to a preferred embodiment, 5 FET drives 370 are provided, namely heating (W), cooling (Y), fan (G), auxiliary (AUX) and compressor direction (O/B). Not shown are the circuit returns such as RH (return for heat) and RC (return for cooling). According to some embodiments the thermostat can control a humidifier and/or de-humidifier.

The HVAC functions are controlled by the HVAC control general purpose input/outputs (GPIOs) 322 within microcontroller (MCU) 320. MCU 320 is a general purpose microcontroller such as the MSP430 16-bit ultra-low power MCU available from Texas Instruments. MCU 320 communicates with the head unit via Head Unit Interface 340. The head unit together with the backplate make up the thermostat. The head unit has user interface capability such that it can display information to a user via an LCD display and receive input from a user via buttons and/or touch screen input devices. According to some embodiments, the head unit has network capabilities for communication to other devices either locally or over the internet. Through such network capability, for example, the thermostat can send information and receive commands and setting from a computer located elsewhere inside or outside of the enclosure. The MCU detects whether the head unit is attached to the backplate via head unit detect 338.

Clock 342 provides a low frequency clock signal to MCU 320, for example 32.768 kHz. According to some embodiments there are two crystal oscillators, one for high frequency such as 16 MHz and one for the lower frequency. Power for MCU 320 is supplied at power input 344 at 3.0 V. Circuitry 336 provides wiring detection, battery measurement, and buck input measurement. A temperature sensor 330 is provided, and according to some embodiments and a humidity sensor 332 are provided. According to some embodiments, one or more other sensors 334 are provided such as: pressure, proximity (e.g. using infrared), ambient light, and pyroelectric infrared (PIR).

Power circuitry 350 is provided to supply power. According to some embodiments, when the thermostat is first turned on with insufficient battery power, a bootstrap power system is provided. A high voltage low dropout voltage regulator (LDO) 380 provides 3.0 volts of power for the bootstrap of the MCU 320. The bootstrap function can be disabled under MCU control but according to some embodiments the bootstrap function is left enabled to provide a "safety net" if the head unit supply vanishes for any reason. For example, if the head-unit includes the re-chargeable battery 384 and is removed unexpectedly, the power would be lost and the bootstrap function would operate. The input to this Bootstrap LDO 380 is provided by connectors and circuitry 368 that automatically selects power from common 362 (highest priority), cool 366 (lower priority); or heat (lowest priority) 364.

In normal operation, a 3.0 volt primary LDO 382 powers the backplate circuitry and itself is powered by VCC Main. According to some embodiments, high voltage buck 360 is provided as a second supply in the backplate. The input to this supply is the circuitry 368. According to some embodiments, the high voltage buck 380 can supply a maximum of 100 mA at 4.5 v. According to some embodiments, the VCC main and the Primary LDO 382 can be powered by a rechargeable battery in cases where there is no alternative power source (such as the high voltage buck or USB power, for example).

Figure 4:
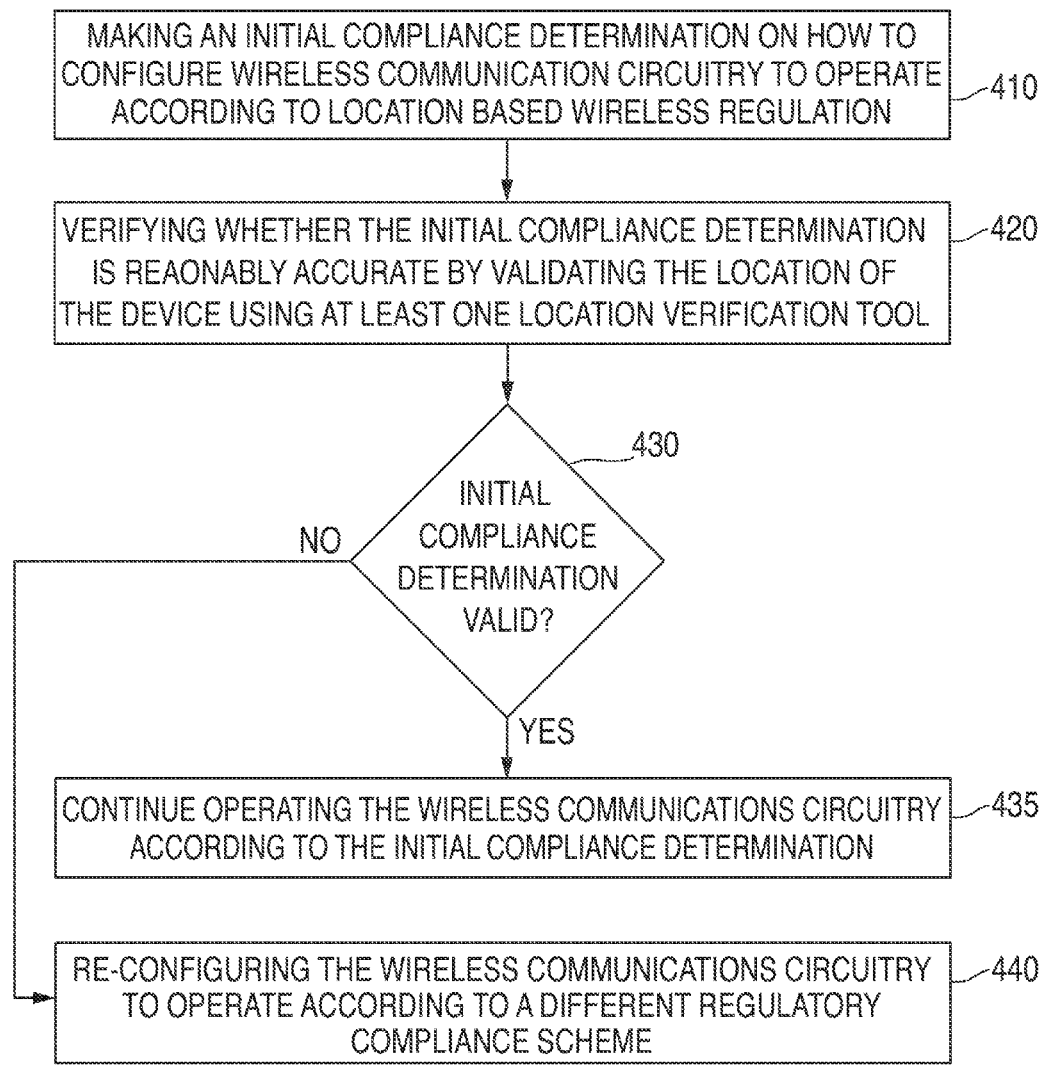
FIG. 4 shows an illustrative flowchart of a process, according to an embodiment.

FIG. 4 shows an illustrative flowchart of steps that may be executed in process 400, according to an embodiment. Starting with step 410, a device may make an initial determination on how to configure wireless communication circuitry to operate according to location based wireless regulations. The device may make an initial compliance determination on how to configure itself using any one of variety of ways. For example, in one embodiment, a user may interact with a user interface to provide the device with an indication of the user's location. Based in the user's input, the device may refer to a compliance database (e.g., similar to the compliance database in FIG. 2) to determine how to configure its one or more wireless communication circuits to comply with the regulations of the user indicated location. As another example, the device may scan all the channels for one or more of the wireless protocols to determine how to initially configure its wireless communication circuit(s) as discussed above.

At step 420, the device can verify whether its initial compliance determination is reasonably accurate by validating the location of the device using one or more location verification tools. For example, the device can access one or more of the location verification tools shown in and described with respect to FIG. 5 to validate the initial compliance determination. Then, at step 430, a determination is made whether the initial compliance determination is validated. The process by which the determination is made may involve relatively simple binary decision-making process or a more elaborate multiple factor decision making process. For example, in a binary decision making process, the device may cross check the results of one or more of the location verification tools with the initial configuration to ensure that there is no concrete evidence that the wrong regulatory scheme was selected. For example, if the initial regulatory scheme is for region X, but one of the location verification tools concretely confirms that the device is not situated in region X, the device can determine that the initially selected regulatory scheme for the device is not correct. A multiple factor decision-making process may take into account the initial determination and the results of one or more location verification tools. Since many of the location verification tools may not provide concrete evidence of location, but rather, an indication of potential location, the results may be used in a statistical manner to arrive at a probability of whether the initial compliance determination is correct. The factors obtained from various location tools may be weighted differently to account for variations in their ability to provide an indication of location.

If the determination at step 430 is YES, the device may continue to operate its wireless communications circuitry according to the initial determination, as shown by step 435. If the determination at step 430 is NO, the device may re-configure its wireless communications circuitry to operate according to a different regulatory compliance scheme, as shown by step 440. For example, the new regulatory compliance scheme may be based on the location ascertained by one or more of the location verification tools.

Figure 5:
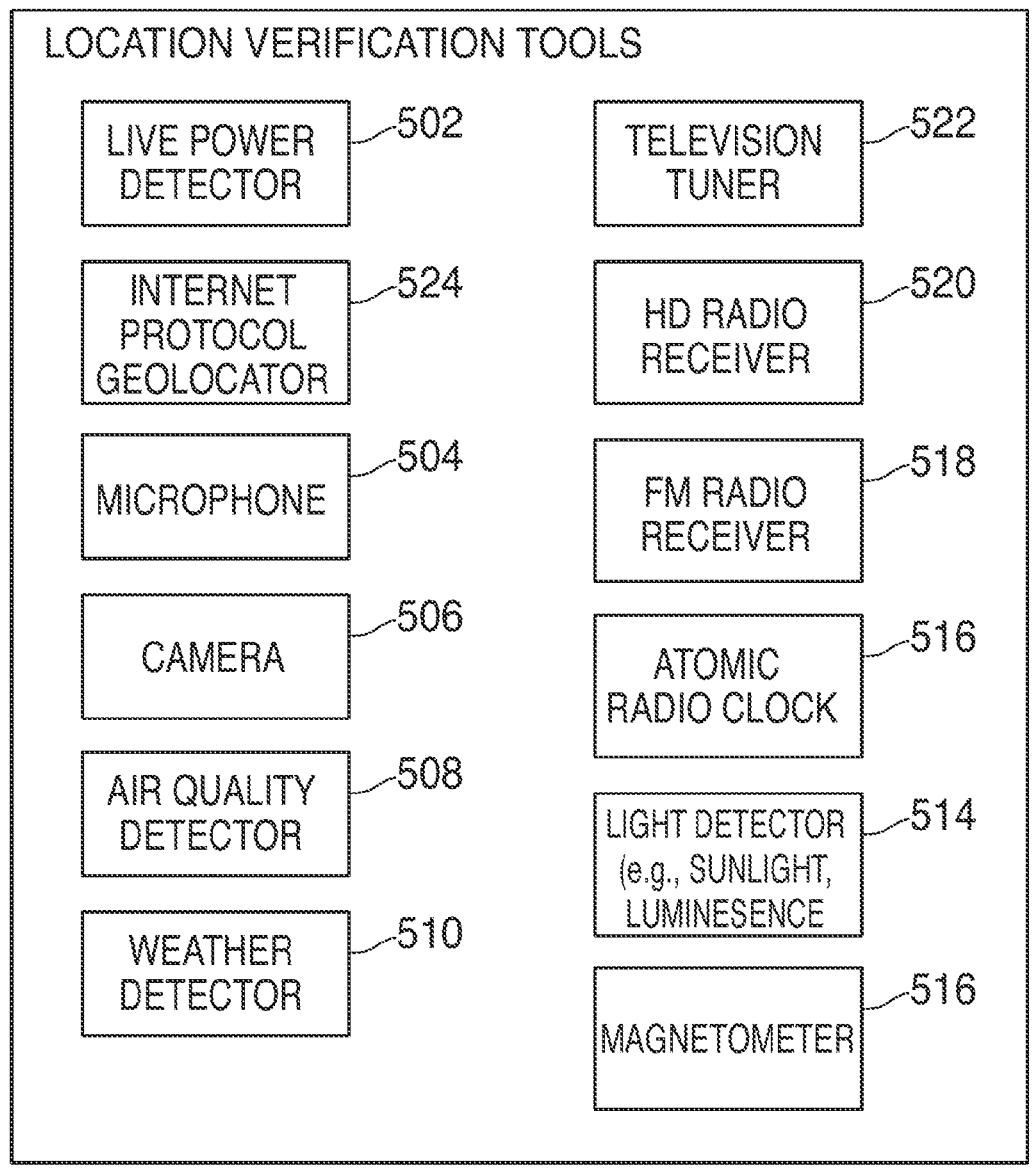
FIG. 5 shows an illustrative block diagram of location verification tools, according to an embodiment.

FIG. 5 shows an illustrative collection of location verification tools that may be used by a device, according to an embodiment. Each tool will now be discussed. Line power detector 502 may be able to detect the line voltage and/or frequency of the line power being provided to the device. As defined herein, line power is the power supplied by a utility company. The line power is transmitted as alternating current (AC) power over a distribution network. The distribution network typically includes regional and local distribution. Local distribution may be responsible for providing line power for commercial and residential uses. In most of the world, local power ranges between 100-240 volts and operates at a frequency of 50 Hz or 60 Hz. Each country specifies the particular voltage and frequency of its line power. In the United States, for example, line power is normally provided at 120 volts at 60 Hz. In most of Europe, line power is normally provided at 240 volts at 50 Hz. Since the line voltage and frequency is an indicator of geographic location, line power detector 502 can be used to provide a clue as to where the device may be located.

Figure 6:
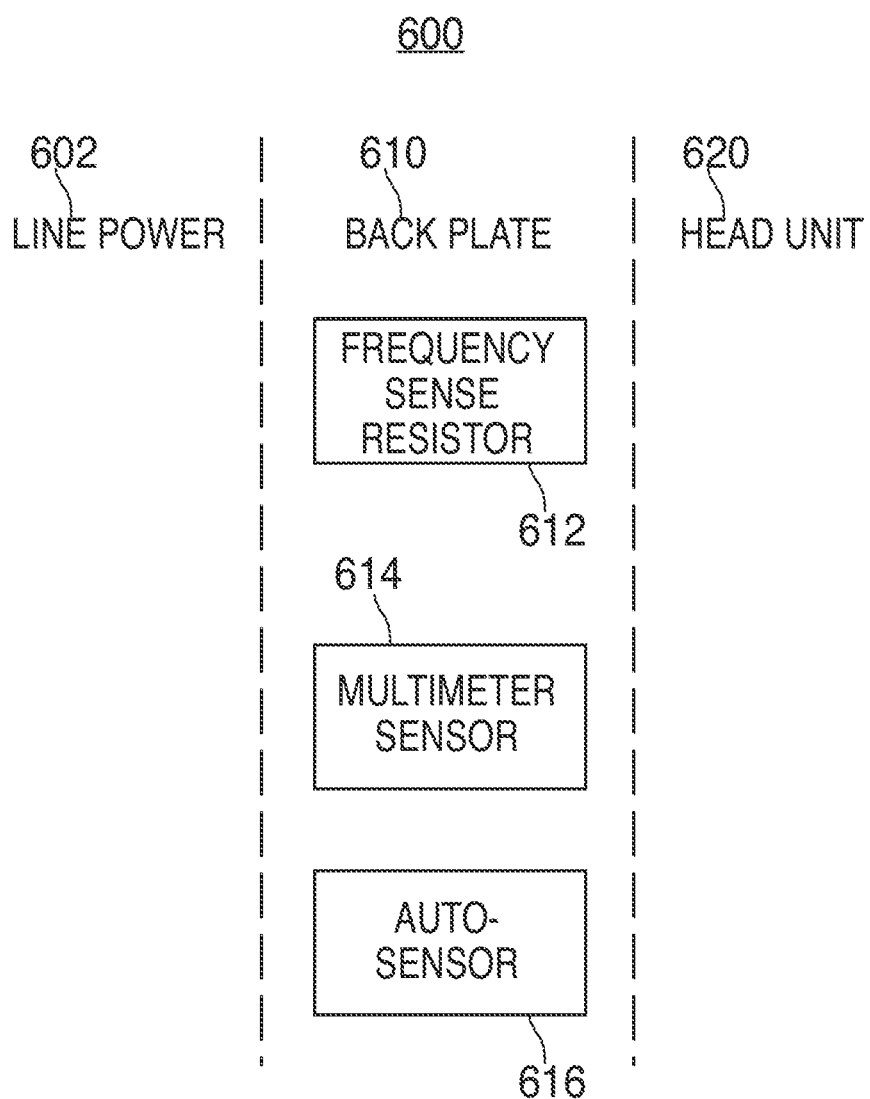
FIG. 6 shows illustrative block diagram of a thermostat having a line power detector, according to an embodiment.

FIG. 6 shows an illustrative schematic diagram of a device 600 using different component setups for line power detection, according to various embodiments. As shown, device 600 can include backplate 610 and head unit 620. Backplate 610 and head unit 620 may be similar to the backplate and head unit of FIG. 3A. Backplate 610 may be coupled to line power 602 and can be operative to convert the line power to voltage and power levels suitable for use by a processor or other components associated with backplate 610 and head unit 620. Backplate 610 may be equipped with any suitable component setup for determining line power characteristics. For example, in one embodiment, frequency sense resistor 612 may be used to determine line power characteristics. Since the value of resistor 612 is known, the device can extrapolate the line voltage and frequency by measuring a voltage drop the resistor and/or current through the resistor.

In another embodiment, multi-meter sensor 614 may be incorporated into backplate 610 to determine line power characteristics. Multi-meter sensors are typically embodied as hand-held devices, but the circuitry contained therein may be included in backplate 610. In yet another embodiment, auto-sensor 616 may be used to determine line power characteristics. Auto-sensors are commonly used, for example, in power supplies to detect power characteristics of the line power so that it can operate appropriately to produce the desired power output.

Referring back to FIG. 5, microphone 504 may be used to monitor audio clues that may provide an indication of the device's location. For example, microphone 504 may monitor natural spoken language or other audio clues. If microphone 504 detects German, the device may be provided with a clue that it is potentially located in a German speaking country.

Camera 506 may be used to monitor visual clues that may provide an indication of the device's location. For example, camera 506 can monitor the faces of people and determine a location based thereon. A facial recognition program may be run to ascertain the identity of the monitored faces, and based on any recognition, it can be inferred where the device is located. For example, the facial recognition program may access social media outlets to look for matches and when a match is found, the information on the social media site may provide location information.

Air quality detector 508 may monitor air quality to identify where the device may be located. Certain geographic locations may have distinct air profiles that can be mapped and detected. Weather detector 510 may monitor weather conditions to identify where the device may be located. Weather patterns may be associated with geographic locations. Thus, if the device is initially configured for operation in the United States during the summer, but the weather indicates that the temperature is indicative of winter, this may provide a clue that the device is not located where it thinks it is located. Light detector 512 may be used to detect presence of and duration of light. The light may include sunlight or artificial light. If sunlight is being detected, the device may leverage readings from magnetometer 514 to ascertain a regional geographic location based on hours of detected sunlight. Certain forms of artificial light may provide clues regarding the frequency of the line power being supplied to the light. For example, some florescent lights flicker in accordance with the frequency of the line power. If the flicker can be detected, it may be possible to discern the power line frequency, which as discussed above, provides a clue for location.

Atomic clock 516 may be used to provide an indication of location. FM radio receiver 518 may be used to obtain RDS data that is provided with FM radio broadcast. The RDS data may contain clues that indicate the location of the device. Similar such clues may be obtained from HD signals that can processed by HD radio receiver 520 and vertical blanking interval data (or other data) that may be obtained by television tuner 522.

Internet protocol geolocator 524 may be used to correlate an IP address with a geographic location. The IP address may be associated with the device or a modem that is connected to the device. When the IP address is obtained, it may be checked against a database of IP addresses to determine a location.

Figure 7:
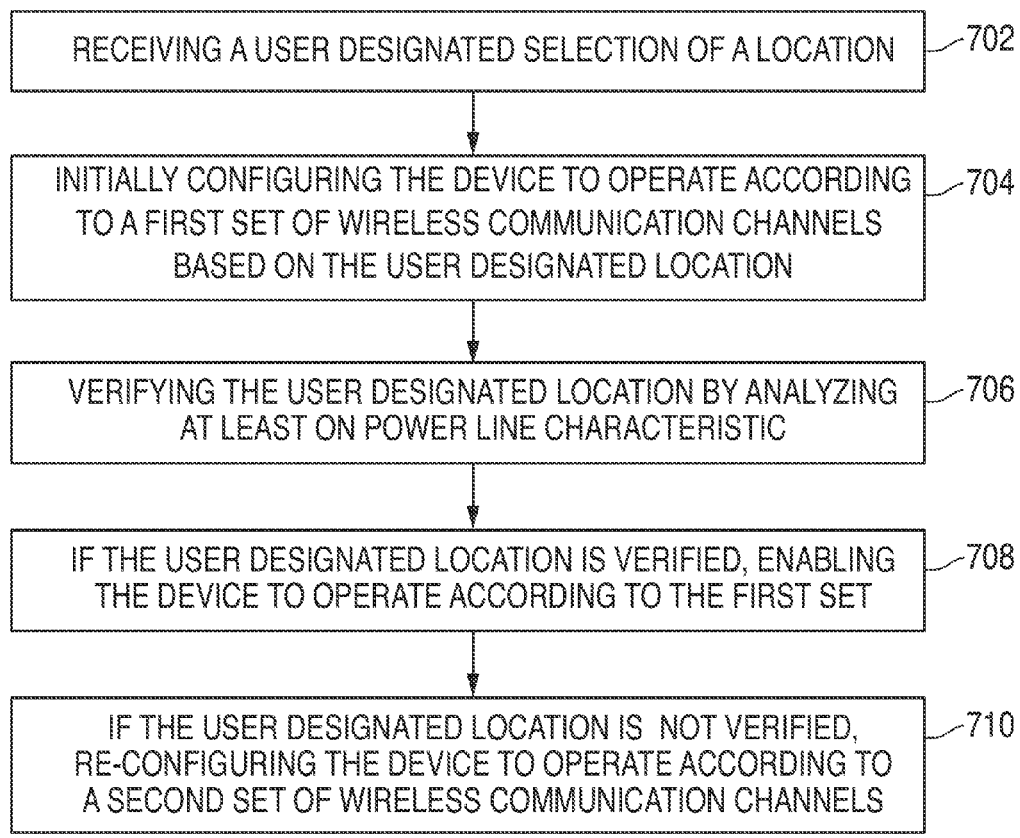
FIG. 7 shows illustrative flowchart of another process, according to an embodiment.

FIG. 7 shows an illustrative flowchart of process 700 according to an embodiment. Beginning at step 702, a user-designated selection of a location is received. The user may use a user interface (e.g., user interface module 215) of a device to select his or her location. At step 704, the device may be initially configured to operate according to a first set of wireless communication channels based on the user-designated location. For example, if the user selects the United Kingdom, the device may configure its wireless circuitry to comply with the wireless regulations of the United Kingdom. At step 706, the user-designated location may be verified by analyzing at least one line power characteristic. For example, a line power detector (e.g., detector 502) may determine a line voltage and/or frequency of line power being provided to the device.

If the user-designated location is verified, at step 708, the device may be enabled to operate according to the first set. For example, if the line power detector detects a line power frequency of 50 Hz, this indicates that the user-designated location is not invalid. If the user-designated location is not verified, at step 710, the device may be reconfigured to operate according to a second set of wireless communication channels. For example, if the line power detector a line power frequency of 60 Hz, this may indicate that the user-designated location is invalid because the United Kingdom operates at 50 Hz, not 60 Hz. Based on the 60 Hz line power frequency, the wireless communications circuitry may be instructed to operate according to a wireless regulatory scheme other than that specified for the United Kingdom. In some embodiments, the user may be prompted to re-enter a user-designated location if the first user-designed location is deemed invalid.

It should be understood that the flowcharts of FIGS. 4 and 7 are merely illustrative and the additional steps may be added, steps may be omitted, and the order of the steps may be rearranged.

Any processes described with respect to FIGS. 1-7, as well as any other aspects of the invention, may each be implemented by software, but may also be implemented in hardware, firmware, or any combination of software, hardware, and firmware. They each may also be embodied as machine- or computer-readable code recorded on a machine- or computer-readable medium. The computer-readable medium may be any data storage device that can store data or instructions that can thereafter be read by a computer system. Examples of the computer-readable medium may include, but are not limited to, read-only memory, random-access memory, flash memory, CD-ROMs, DVDs, magnetic tape, and optical data storage devices. The computer-readable medium can also be distributed over network-coupled computer systems so that the computer readable code is stored and executed in a distributed fashion. For example, the computer-readable medium may be communicated from one electronic subsystem or device to another electronic subsystem or device using any suitable communications protocol. The computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module or state machine discussed herein may be provided as a software construct, firmware construct, one or more hardware components, or a combination thereof. For example, any one or more of the state machines or modules may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules or state machines are merely illustrative, and that the number, configuration, functionality, and interconnection of existing modules may be modified or omitted, additional modules may be added, and the interconnection of certain modules may be altered.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments is not intended to limit their scope.

What is claimed is:

1. A method for enforcing wireless regulatory compliance for a wirelessly enabled thermostat, the method comprising:
receiving a user designated location of the thermostat, wherein the user designated location is a geographic location;
initially configuring the thermostat to operate according to a first set of wireless communication channels based on the user designated location;
verifying the user designated location by analyzing at least one line power characteristic;
when the user designated location is verified, enabling the thermostat to operate according to the first set of wireless communication channels; and
when the user designated location is not verified, reconfiguring the thermostat to operate according to a second set of wireless communication channels, wherein each of the wireless communication channels of the first and second set of wireless communication channels is characterized by a specific frequency.

2. The method of claim 1, wherein the verifying comprises:

analyzing a frequency of line power that is connected to the thermostat.

3. The method of claim 2, wherein the user-designated location is a European country and the thermostat is initially configured to operate according to the first set of wireless communication channels, and wherein the analyzed frequency is 60 Hz, the device is re-configured to operate according to the second set of wireless communication channels.

4. The method of claim 3, wherein the second set of wireless communication channels are Wi-Fi channels and the second set of wireless communication channels precludes use of channels 12 and 13.

5. The method of claim 1, wherein the at least one power line characteristic comprises voltage and frequency.

6. The method of claim 1, wherein the first and second set of wireless communication channels are Wi-Fi channels.

7. The method of claim 1, wherein the thermostat is devoid of cellular band wireless communications and global positioning system wireless communications.

8. A method for enforcing wireless regulatory compliance for a home network device, the method comprising:
making an initial compliance determination on how to configure wireless communications circuitry to operate according to a location based wireless regulation;
verifying whether the initial compliance determination is accurate by validating the location of the home network device using at least one location verification tool, wherein the at least one verification tool comprises a plurality of location verification tools, wherein the verifying comprises:
applying weighting factors to results obtained by each of the location verification tools to obtain weighted results; and
determining a probability, based on the weighted results, that the initial compliance determination is accurate;
continue operating the wireless communications circuitry according to the initial compliance determination in response to a verified initial compliance determination; and
re-configuring the wireless communications circuitry to operate according to a different regulatory compliance scheme in response to a non-verified initial compliance determination.

9. The method of claim 8, wherein the wireless communications circuitry operates according to one or more of a plurality of channels, and wherein the making the initial compliance determination comprises:
scanning wireless traffic to determine which of the plurality of channels are being used.

10. The method of claim 8, wherein the at least one location verification tool comprises a line power detector, wherein at least one line power characteristic is indicative of the location of the home network device.

11. The method of claim 8, wherein the verifying comprises:
using a microphone to obtain audio data; and
analyzing the audio data to determine the location of the home network device.

12. The method of claim 8, wherein the verifying comprises:
using a camera to obtain video data; and
analyzing the video data to determine the location of the home network device.

13. The method of claim 8, wherein the verifying comprises:
analyzing at least one of air quality, weather, and sunlight to determine the location of the home network device.

14. The method of claim 8, wherein the verifying comprises:
analyzing luminescence to determine a frequency of power used to power fluorescent light, wherein the frequency is indicative of location of the home network device.

15. The method of claim 1, wherein the verifying comprises:
obtaining an Internet Protocol (IP) address, wherein the IP address is indicative of location of the home network device.

16. A thermostat comprising:
a back plate coupled to line power;
wireless communications circuitry for communicating according to an 802.11 protocol;
a compliance database including a listing of a plurality of country specific wireless regulations for the 802.11 protocol;
a location verification module operative to use at least one location verification tool to assess a location of the thermostat, wherein the at least one location verification tool is coupled to the back plate; and
a control unit operative to control the thermostat, the thermostat further operative to:
select an initial country specific wireless regulation;
use the location verification module to determine a location of the thermostat;
determine whether the location of the thermostat invalidates the selected initial country specific wireless regulation;
configure the wireless communications circuitry to operate according to the selected initial country specific wireless regulation in response to a non-invalidated determination; and
re-configuring the wireless communications circuitry to operate according to a different country specific wireless regulation in response to an invalidated determination.

17. The thermostat of claim 16, wherein the location verification tool comprises a line power detector.

18. The thermostat of claim 16, wherein the location verification tool is selected from the group consisting of line power detector, a microphone, a camera, an air quality detector, a weather detector, a television tuner, a HD radio tuner, a FM radio tuner, an atomic clock, a light detector, a magnetometer, and any combination thereof.

* * * * *